INVENTOR
D. L. WHITE
BY
*Roy M. Porter*
ATTORNEY

INVENTOR
D. L. WHITE
BY
*Ray M. Porter Jr.*
ATTORNEY

3,183,359
OPTICAL MODULATOR EMPLOYING REFLECTION FROM PIEZOELECTRIC - SEMICONDUCTIVE MATERIAL
Donald L. White, Mendham, N.J., assignor to Bell Telephone Laboratories, Incorporated, New York, N.Y., a corporation of New York
Filed Dec. 21, 1961, Ser. No. 161,114
16 Claims. (Cl. 250—199)

This invention relates to optical modulators. More particularly it relates to apparatus for modulating the intensity or phase of coherent radiation at optical wavelengths including particularly the band of infra-red radiation.

It is well known that one or more characteristics of coherent electromagnetic radiation may be modulated in accordance with signal information and that the amount of information which can be transmitted in this manner varies directly as the available frequency bandwidth of the electromagnetic radiation employed. A given percentage bandwidth represents a proportionately wider band at high frequencies than at low.

Recently, the invention of the optical maser has made possible the generation of coherent electromagnetic waves having the high frequencies of visible light and infra-red radiation. Radiation in these frequency ranges is capable of carrying extremely large quantities of information. Furthermore, optical frequency radiation can be transmitted in very narrow beams without the need for large antennae and with consequent economy of radiated power. In order to realize the maximum potential from the newly discovered optical masers it is necessary that apparatus be provided for modulating the coherent light waves at very high frequencies.

It has been known for some time that the reflectivity and the absorption of semiconductive material for optical radiation in certain frequency ranges depends upon the concentration of free charge carriers in the material. This effect has been proposed as a method of optical modulation by electrically varying the number of charge carriers, such as by forming a depletion layer, by means of a non-ohmic junction in the semiconductive material, thereby varying the optical reflectivity at the junction and modulating the reflection of a beam directed at the junction. This and similar devices proposed by the art suffer from the necessity that the modulating beam must penetrate substantial portions of the semiconductive material in order to obtain sufficient coupling with the material and to reach the rather generalized location in which the region of variable reflectivity can be produced. Since the bulk semiconductor material is inherently lossy to optical rays, the efficiency of these modulators is very low. Furthermore, since the reflection occurs from a generalized area, phase interference between the parts of the wave reflected from slightly spaced portions of the material severely limits the bandwidth of the device.

It is accordingly an object of the present invention to modulate coherent optical radiation at very high frequencies with increased efficiency and bandwidth.

In accordance with the present invention a variable optical reflection or optical absorption is produced very near to the surface of the material, reducing both the loss and the phase interference to the optical beam. This is done in the particular embodiments to be described by employing as the elements of variable reflectivity or absorption, materials that are not only low resistivity semiconductors, but that also would be piezoelectric if in high resistivity form. Such an element is provided with at least one optically flat surface upon which the optical beam to be modulated is directed. The modulating signal is converted into an ultrasonic wave which is directed upon the surface and varies the strain in the material near the surface in accordance with the modulation. Since the material is both piezoelectric and semiconductive, variation in the strain produces a corresponding piezoelectric response. Since, however, the material is of low resistivity, the piezoelectric field is shorted out and produces a current which changes the concentration in the region under strain. Variation in the carrier concentration in turn produces a variation in the optical reflection or absorption of the surface which then modulates the light beam. Special features of the invention reside in the way in which a surface of this type, either variably reflective or variably absorptive, is backed by a surface of much greater reflectivity to restrict the modulating interaction to a thin region that is less than an acoustical wavelength.

These and other objects and features, the nature of the present invention and its advantages will appear more fully upon consideration of the following detailed description taken in connection with the illustrative drawings in which.

Figure 1:
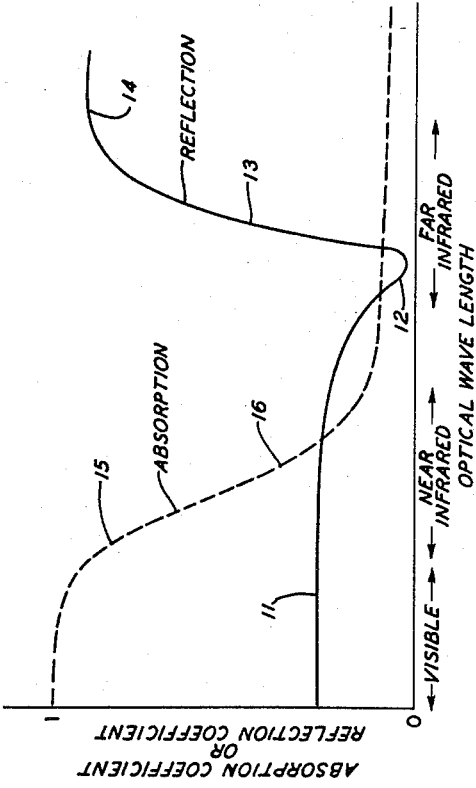
FIG. 1 is an illustrative plot of the absorption and reflection coefficients of a material of the type employed by the present invention versus optical wavelength.

Referring more particularly to FIG. 1, the plots of both the absorption and reflection coefficients versus optical wavelength are shown for a typical semiconductor in order to illustrate the frequency ranges in which the use of each phenomenon is appropriate. In general, the phenomenon of variable reflection is utilized when the operating wavelength of the incident optical radiation is slightly longer than that wavelength known to the art as producing the "reflectivity minimum" in the particular material under consideration. This relationship exists in the III–V and some II–VI semiconductor compounds for radiation in the band referred to as far infra-red, that is, the band from 10 to 100 microns. The phenomenon of variable absorption is utilized when the operating wavelength of the incident optical radiation is that known to the art as falling on the "absorption edge" of the particular material under consideration. This relationship exists in III–V and II–VI semiconductor compounds for radiation in the band referred to as the near infra-red, that is, the band from .8 to 10 microns. As will be described, considerable control over the operating frequency within both bands is had by control over the concentration of the initial conductive impurities in the materials.

Specifically, curve 11 represents the reflection coefficient variation and shows that from the short wavelengths of the visible spectrum up through the near infra-red, the material has a more or less constant residual reflection. As the wavelength is increased, a region 12 is reached in the far infra-red band that is referred to in the art as the reflectivity minimum. On the long wavelength side of the reflectivity minimum is a region 13 in which the reflection coefficient increases rapidly with wavelength to a maximum 14 of high reflection. Further analysis of the phenomena responsible for the reflectivity minimum and characteristics of typical compounds can be found in an article by Spitzer and Fair in 106 Physical Review 882, June 1, 1957.

The absorption coefficient represented by characteristic 15 has a maximum value for the visible spectrum which continues until the region known as the "absorption edge" is reached which may be in the visible or in the near infra-red range. Here the absorption drops rapidly as indicated by portion 16 of the characteristic because the longer wavelengths no longer have sufficient energy to lift the electrons from the valence band into the conduction band and hence be absorbed. Further analysis of the absorption edge and characteristics of typical compounds can be found in "Optical Properties of Semiconductors" by T. S. Moss, Academic Press, 1959.

Thus, it is seen that both absorption and reflection depend in different ways upon the concentration of electrons in the material. In both cases, increasing the electron concentration results in shifting characteristics 11 and 15 toward shorter wavelengths (greater energy) without substantially changing the shape of the characteristics. Decreasing the electron concentration results in shifting both characteristics toward longer wavelengths. Thus, each characteristic could be drawn as a family of characteristics for different concentrations.

Figure 2:
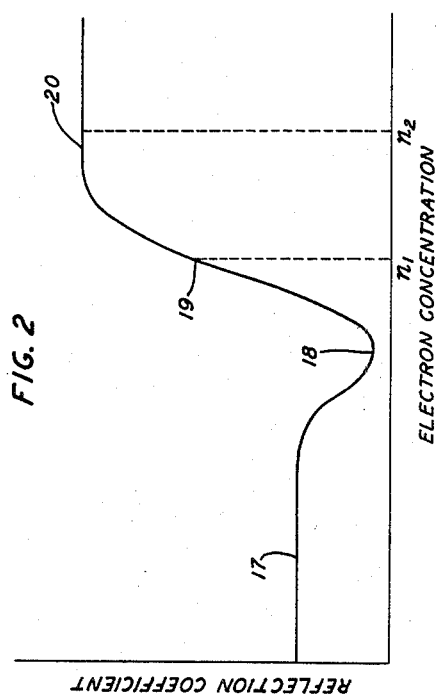

This effect of electron concentration on reflection may be more clearly seen by the plot shown in FIG. 2 of the reflection coefficient versus electron concentration for a given frequency in the far infra-red range. As the concentration is increased, the semi-conductor is, in general, transparent until the reflectivity minimum 18 is reached. Thereafter the reflection coefficient increases rapidly in region 19 to the region of maximum reflection 20. Thus, a concentration $n_1$ in region 19 has a reflection coefficient that varies rapidly as $n_1$ is changed while $n_2$ in region 20 represents a condition that is highly reflective and substantially constant.

Figure 3:
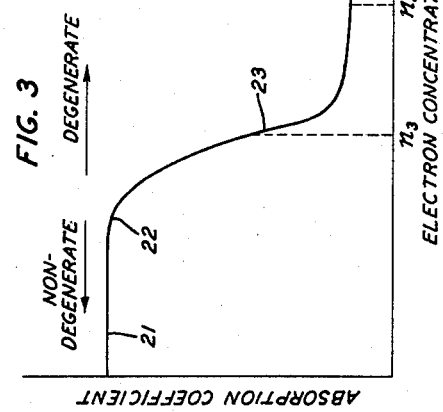
FIGS. 2 and 3 are illustrative plots of the reflection and absorption coefficients, respectively, of these materials versus the electron concentration therein.

Similarly, the effect of electrons concentration on the absorption coefficient is shown in FIG. 3 for a given frequency. The absorption is maximum for small electron concentrations as shown by portion 21 until point 22 is reached at which the absorption edge starts. In materials that are preferred for the invention but not necessarily in all that could be used to practice the invention, the concentration up to point 22 corresponds roughly to the concentration referred to in other semiconductive arts as producing a non-degenerate semiconductor. Greater concentration causes the semiconductor to become degenerate and the absorption to decrease rapidly as shown by portion 23 until a minimum of absorption is reached as represented by 24. Thus, a concentration $n_3$ in region 23 has an absorption coefficient that varies rapidly as $n_3$ is varied while $n_4$ in region 24 represents a condition that is relatively transparent and substantially constant. Further consideration will be given to these characteristics and to the specific values $n_1$ through $n_4$ hereinafter in the course of explaining the specific embodiments of the invention. It should be understood, of course, that the characteristics shown in the drawings are somewhat idealized and that experimental data indicates more erratic behavior at the extremes of either wavelength or electron concentration than the drawings indicate. The present invention is, however, not concerned with these extremes.

The foregoing has summarized the semiconductive-optical coupling in the materials utilized by the invention. It is to be noted that the present invention utilizes the properties of materials that are both semiconductive and piezoelectric and, therefore, a word should also be said for the piezoelectric-ultrasonic coupling of these materials. It is only recently that piezoelectric effects have been observed in most of the materials here contemplated because they are generally too conductive to support the electric field usually associated with a piezoelectric response. However, it has been discovered, in accordance with the present invention, that the electron concentration required for proper semiconductive-optical coupling as described above is also that concentration which gives the material a high conductivity in the range in which the electron concentration may be bunched or varied by variable strain produced by an ultrasonic wave. The change in concentration in highly conductive material in effect replaces the ordinary piezoelectric electric field response that is exhibited when the material is highly resistive. Thus, when an ultrasonic wave is passed into a material that has an initial electron concentration such as $n_1$ or $n_3$, the concentration in any given plane normal to the propagating ultrasonic wave is varied about the initial concentration in a sinusoidal way that corresponds to the frequency and amplitude of the ultrasonic wave.

Figure 4:
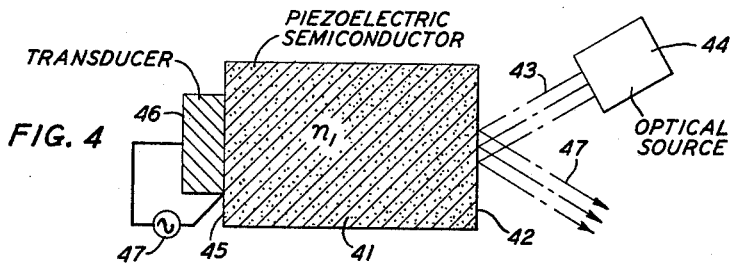
FIG. 4 is a simplified schematic showing of a reflectivity modulator in accordance with the invention.

Referring now to FIG. 4, an illustrative embodiment of the invention utilizing variable reflectivity is shown in simplified form. The reflecting element comprises a block 41 of low resistivity, piezoelectric, semiconductive material preferably from group III–V such as gallium arsenide, indium antimonide or indium arsenide, but alternatively from group II–VI. The material of block 41 is doped with conductive impurity atoms to give it the electron concentration represented by $n_1$ on FIG. 2 for the wavelength to be modulated. In a typical embodiment employing gallium arsenide and designed to operate at a wavelength of 27 microns, $n_1$ would represent approximately $10^{18}$ ionized impurity atoms per cc. Suitable doping materials are zinc, tin, sulphur, selenium and other materials familiar to the art that have known usefulness in increasing the conductivity of compounds such as gallium arsenide. It appears preferable that the impurity be of a donor material because of the greater mobility of electrons as opposed to holes but an acceptor impurity would be satisfactory.

A face 42 of block 41 that is substantially normal to any piezoelectric axis of the material is polished to an optical flatness. The face 45 opposite face 42 is bonded to a suitable ultrasonic transducer 46 which converts the electrical modulating signal from source 47 into acoustical vibrations which travel into block 41 toward face 42. Transducer 46 may be a depletion layer transducer as described in my copending application Serial No. 64,808, filed October 25, 1960, an epitaxial transducer as described in my copending application Serial No. 147,283, filed October 24, 1961, or any other suitable transducer.

The ultrasonic waves travel through block 41 to surface 42 where they are either reflected or pass through depending upon the acoustic discontinuity at the surface. In either event, the surface 42, as all other parts of block 41, experiences a sinusoidal variation of strain proportional to the frequency and amplitude of the ultrasonic wave. This strain causes the electron concentration in surface 42 to vary about $n_1$, changing the reflectivity of the surface along portion 19 of the characteristic of FIG. 2. An optical beam 43 from source 44 is directed upon surface 42 and the changing reflectivity of the surface is reproduced as modulation of the reflected beam 47.

As mentioned above, the improvements afforded by the present invention over prior devices stem from the fact that interaction of the optical beam with its modulating parameters occurs at or near the surface of the material. However, neither reflection nor absorption are strictly surface phenomenon. Therefore, it is important that the skin depth of the face 42 (the degree to which the light penetrates when being reflected) is less than or comparable to a half wavelength of the ultrasonic wave. Otherwise, the optical energy is reflected from portions under the surface that are strained in proportion to different phases of the ultrasonic wave. The efficiency of the modulator will thus be reduced by phase cancelling effects in the reflected beam. This effect is reduced by having the conductivity of block 41 as high as possible consistent with the other considerations described herein.

Figure 5:
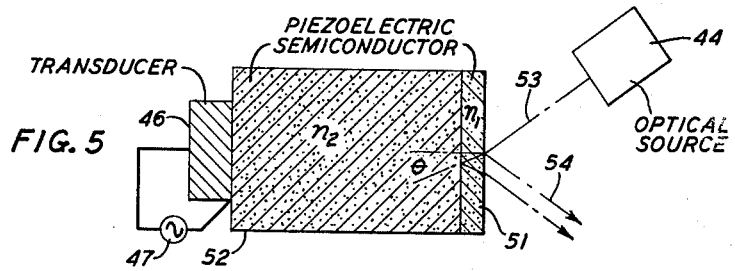
FIG. 5 illustrates an improved form of the modulator of FIG. 4.

The embodiment of FIG. 5 illustrates the use of a thin, variably reflecting member upon a more reflecting substrate to restrict reflection to a thickness substantially less than an acoustical wavelength. Thus, 51 represents a thin film or layer of material having a composition and an electron concentration $n_1$ like element 42 of FIG. 4. Film 51 is bonded in any suitable manner to substrate element 52, which has sufficient conductivity to be almost completely reflective to optical energy from source 44. While there are numerous combinations of materials from which film 51 and substrate 52 may be formed and numerous ways in which they may be bonded, the desired very small thickness of film 51 makes the construction according to one feature of the invention particularly desirable. Thus, it is proposed that film 51 be formed either epitaxially or by diffusion upon substrate 52 which is of the same material but of different conductivity than film 51. Substrate 52 is doped to give it an electron concentration represented by $n_2$ of FIG. 2 giving it substantially the maximum possible reflection coefficient. Layer 51 is then formed by epitaxially depositing sufficiently more pure material so that the carrier concentration corresponds to $n_1$ on FIG. 2. Further details concerning the conditions necessary for and the procedures to be followed in producing an epitaxial layer may be found in my copending application Serial No. 147,283, filed October 24, 1961. Alternatively, layer 51 may be formed on substrate 52 by diffusing into the surface of 52 an impurity which compensates the current carriers in the layer material to reduce the concentration therein to $n_1$. As a specific example, n-type gallium arsenide may be compensated by copper or by small amounts of zinc. Other compensating materials and techniques for handling them are known to the art.

The face of block 52, upon which layer 51 is to be formed, must be selected with a view to the orientation of the piezoelectric axis desired in layer 51. Recall that the nature of epitaxial growth is such that the deposited crystals build up in an alignment that follows the crystal orientation of the substrate. Therefore, the selected face should be one that is normal to a piezoelectric axis. The same considerations exist if layer 51 is formed by diffusion. When the layer is formed epitaxially or by diffusion it is then possible to give it a thickness approximately a small multiple of an optical wavelength. If the layer 51 were of thickness $$\frac{n\lambda}{2 \cos \theta}$$

where $n$ is a small integer, the layer would be what is known in optics as a non-reflecting film. As a result of complicated interactions of multiple reflections and refractions within the film, the incident wave is not reflected even though reflection from bulk material of electron concentration $n_1$ and $n_2$ would be high. This exact value is, therefore, to be avoided. However, if the thickness is either a little more or less than $$\frac{n\lambda}{2 \cos \theta}$$

the reflection will be neither high nor low, but will depend on the index of refraction which, in turn, depends upon the electron concentration of the material $n_1$. Thus, variations of $n_1$ by ultrasonic waves cause the incident beam 53 to be variably reflected as beam 54 in accordance with the variations of the ultrasonic wave.

Figure 6:
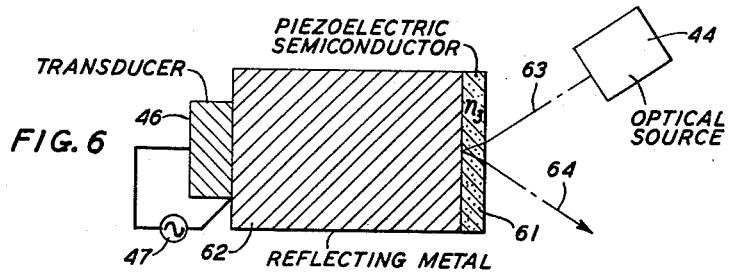
FIG. 6 is a simplified schematic showing of an absorptive modulator in accordance with the invention.

Referring now to FIG. 6, an illustrative embodiment of the invention utilizing variable absorption is shown in simplified form. The absorbing element comprises a thin layer 61 of low resistivity piezoelectric, semiconductive material from group III–V or group II–VI. The material of layer 61 is doped with conductive impurity atoms to give it the electron concentration represented by $n_3$ on FIG. 3 for the wavelength to be modulated. In a typical embodiment employing degenerate indium antimonide and designed to operate at a wavelength of 7 microns, $n_3$ represents approximately $10^{18}$ ionized impurity atoms per cc.

Layer 61 is suitably formed upon or bonded to a block 62 of material substantially completely reflective to the wavelength to be modulated which, in turn, is bonded to transducer 46. Since it is very difficult to make semiconductive materials of the classes constituting element 61 reflective at the frequencies for which variable absorption is exhibited, the material of block 62 will be different from that of 61 and will preferably constitute one of the highly conductive, true metals that are highly reflective at these wavelengths. Modulation of beam 63 takes place as it is variably absorbed in passing through layer 61, reflected from substrate 62, and re-passes through layer 61 to emerge as modulated beam 64.

As in the reflecting embodiments and for analogous reasons, it is important that layer 61 be thinner than one-half wavelength of the ultrasonic energy. In the embodiment of FIG. 6 this thickness may be obtained by employing as layer 61 a coating which is applied by brush or spray or a very thin wafer which has been lapped after bonding to the required thinness. The processes of epitaxial growth or diffusion are not ordinarily available because of the difference in composition of substrate 62 and layer 61 made necessary by the fact that one is required to be reflective at the same wavelength that the other is absorptive.

Figure 7:
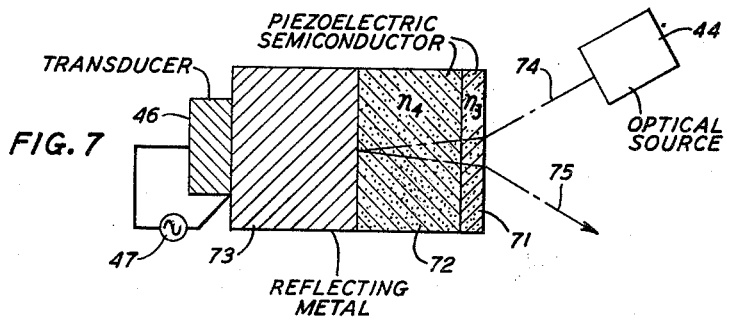
FIG. 7 illustrates an improved form of the modulator of FIG. 6.

A sufficiently thin absorption layer may be formed epitaxially or by diffusion in a structure such as shown in FIG. 7 by employing an intermediate transparent substrate between the absorption layer and the reflective base. Thus, 71 represents a thin film or layer of material having a composition and an electron concentration $n_3$ like element 61 of FIG. 6. Film 71 is formed by epitaxial growth or diffusion upon an intermediate substrate 72 of a material that is compatible with that of layer 71 from the standpoint of the selected method of fabrication. For example, the materials may be the same except for the degree of impurity or they may at least have similar crystal structures. Substrate 72 is doped to give it a carrier concentration represented by $n_4$ on FIG. 3 which makes it substantially transparent to the optical wavelength under consideration. Layer 71 is then formed upon substrate 72 by epitaxially depositing a layer of sufficiently more pure material so that the carrier concentration corresponds to $n_3$ on FIG. 3. Further details concerning the conditions necessary for and the procedures to be followed in producing an epitaxial layer may be found in my copending application Serial No. 147,283, filed October 24, 1961. Alternatively, layer 71 may be formed by diffusing into the substrate 72 an impurity material which compensates the current carriers in a layer portion and renders the layer of higher absorption than the substantially transparent substrate. Intermediate substrate 72 is then bonded to the reflecting material of base 73, which, in turn, is connected to transducer 46.

In operation, beam 74 from source 44 is variably absorbed as it passes through layer 71. However, the beam is substantially unaffected as it passes through the intermediate substrate 72 since variations about the concentration $n_4$ have little effect upon the absorption of material. The beam is then reflected from base 73, re-passes through intermediate substrate 72 and layer 71 to emerge as modulated beam 75.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:
1. Apparatus for modulating a beam of coherent electromagnetic radiation in the optical frequency range comprising a member of material which has piezoelectric properties when in high resistivity form but which has an electron concentration that renders said material semi- conductive with a resistivity that is substantially below that for which a substantial piezoelectric field is supported, means for directing said beam upon said member, means for launching an acoustic wave within said material, and means for modulating said acoustic wave.

2. The apparatus of claim 1 wherein said material is one selected from the class consisting of Group III–V compounds and Group II–VI compounds wherein said groups refer to the periodic table of elements.

3. Apparatus for modulating a beam of coherent electromagnetic radiation in a given optical frequency range comprising a member of semiconductive material of the type which has piezoelectric properties when in high resistivity form, said material having a concentration of free charge carriers that determines the parameters of reflectivity and absorption of said member to said radiation in said range and which reduces said resistivity substantially below that for which a substantial piezoelectric field is supported, said member having at least one optically flat surface, means for directing said beam upon said surface, and means for varying the strain of the material of said surface in response to a modulating signal to vary said concentration of charge carriers and to vary the effect of at least one of said parameters upon said beam.

4. The apparatus of claim 3 wherein said concentration of free charge carriers is in the range for which said one parameter varies rapidly with any change in said concentration for radiation in said given optical frequency range.

5. The apparatus of claim 4 wherein said member is thin and is backed by a second member of high reflectivity to radiation in said given optical frequency range.

6. The apparatus of claim 3 wherein said concentration produces the optical reflectivity minimum in said material at a wavelength that is slightly shorter than the wavelength of said given optical frequency whereby the reflectivity of said material is varied by said strain.

7. The apparatus of claim 6 wherein said given optical frequency is in the far infra-red band.

8. The apparatus of claim 3 wherein said concentration produces an optical absorption edge in said material at said given optical frequency whereby the absorption of said material is varied by said strain.

9. The apparatus of claim 8 wherein said given optical frequency is in the near infra-red band.

10. Apparatus for variably reflecting a beam of coherent electromagnetic radiation in a given optical frequency range comprising a first member of piezoelectric semiconductive material having a first electron concentration for which the reflection coefficient thereof for radiation in said given range varies rapidly with changes in said concentration, a second member located contiguous to said first member of semiconductive material having an electron concentration greater than said first concentration, means for directing said beam upon said first member, and means for launching an acoustic wave in said members directed toward said first member.

11. The apparatus according to claim 10 wherein said first member has a thickness less than one-half wavelength of said acoustic wave.

12. The apparatus according to claim 10 wherein said first member has a thickness less than one-half wavelength of said given optical range.

13. The apparatus according to claim 12 wherein said first member is an epitaxially deposited film upon said second member.

14. Apparatus for variably absorbing a beam of coherent electromagnetic radiation in a given optical frequency range comprising a first member of piezoelectric semiconductive material having a first electron concentration for which the absorption coefficient thereof for radiation in said given range varies rapidly with changes in said concentration, a second member located behind said first of high reflectivity to radiation in said given optical frequency range, means for directing said beam upon said first member, and means for launching an acoustic wave in said members directed toward said first member.

15. The apparatus of claim 14 wherein a third member is interposed between said first and second members, said third member being of semiconductive material having an electron concentration greater than said first concentration.

16. The apparatus of claim 15 wherein said first member is an epitaxially deposited film upon said third member.

References Cited by the Examiner

UNITED STATES PATENTS

| 1,810,475 | 6/31 | Hansell _____ 329—144 |
| 2,155,661 | 4/39 | Jeffree. |
| 3,055,258 | 9/62 | Hurvitz _____ 332—3 XR |

OTHER REFERENCES

Filinski: Physical Review, vol. 107, No. 4, August 15, 1957, page 1193.

Mason et al.: Journal of the Acoustical Society of America, vol. 29, No. 10, October 1957, pages 1096 to 1101.

DAVID G. REDINBAUGH, *Primary Examiner.*

MAYNARD R. WILBUR, *Examiner.*